Sept. 8, 1964

P. A. MOUNTZ 3,147,844

OBJECT CONVEYING AND POSITIONING APPARATUS

Filed April 17, 1963

INVENTOR.
Paul A. Mountz
BY
Attorneys

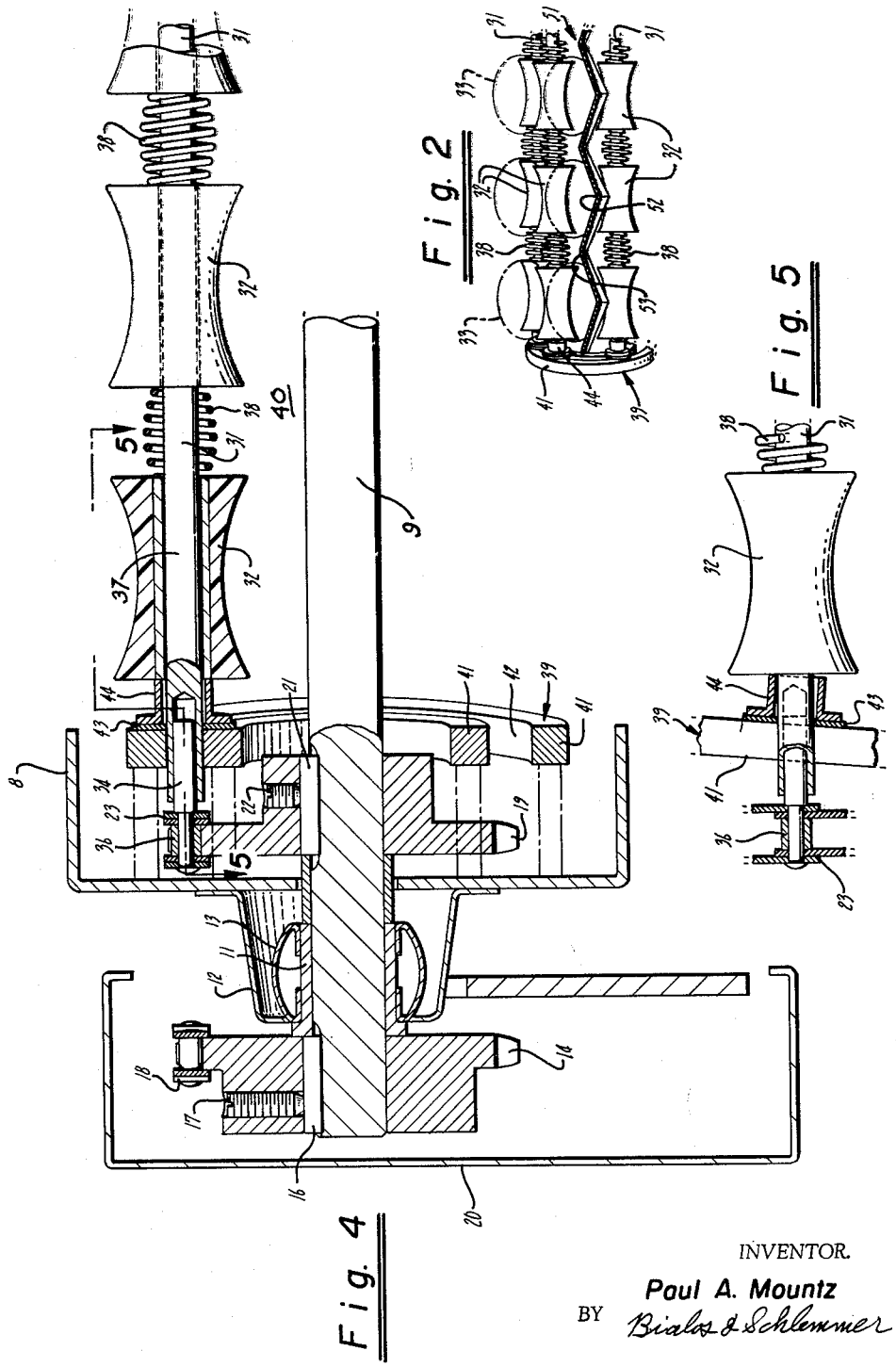

United States Patent Office 3,147,844
Patented Sept. 8, 1964

3,147,844
OBJECT CONVEYING AND POSITIONING
APPARATUS
Paul A. Mountz, Menlo Park, Calif., assignor to Latham
Manufacturing Company, Redwood City, Calif., a corporation of California
Filed Apr. 17, 1963, Ser. No. 273,766
7 Claims. (Cl. 198—34)

This invention relates to apparatus for conveying and positioning or rearranging objects as they are transferred from one conveyor to another, and more particularly, to mechanism of the character related which is especially adapted for conveying and rearranging the spacing between rows of eggs.

Frequently, when rows of eggs are to be conveyed from one main conveyor to another, for example, from an egg washer conveyor to an egg grader conveyor, the conveyors are of different widths. It, therefore, becomes necessary to provide transfer conveying means interposed between the ends of the two conveyors to reposition or rearrange the eggs by widening out or narrowing the spacing between the rows of eggs, whichever the case may be. Types of transfer mechanism of such character are disclosed in United States Patents Nos. 2,488,230 and 2,531,292.

Objects of the instant invention, among others, are to provide an improved transfer mechanism for the purpose related which will operate more efficiently; is of simpler and more economical construction; minimum frictional drag is imposed on members which support the objects as they are conveyed; and in which positive driving of such supporting members is obviated. Other objects will become apparent from the following description.

Summarizing the invention, the apparatus hereof comprises a plurality of substantially parallel spaced apart shafts together with means for supporting and moving the shafts in an endless closed path. These shafts each carry a like number of freely journalled rollers which are freely axially slidably therealong, with resilient means interposed between all adjacent rollers on the respective shafts to thrust the rollers apart. Spaced apart confining guides are provided adjacent the outermost rollers at the respective ends of the shafts.

The guides are inclined relative to each other to provide a tapered guideway which causes automatic adjustment of the spacing between the egg supporting rollers on the shafts as they are moved. The inclination is such that the rollers properly accommodate the eggs from one main conveyor from which they are received, and spread them apart or bring them together to feed properly to the other conveyor onto which they are to be transferred.

Reference is now made to the drawings for a more detailed description of an advantageous embodiment of the invention, wherein:

FIG. 2 is a fragmentary transverse vertical sectional view taken in a plane indicated by the line 2—2 in FIG. 1;

FIG. 4 is an enlarged fragmentary upright transverse sectional view taken in a plane indicated by the line 4—4 in FIG. 3;

FIG. 5 is a fragmentary horizontal sectional plan view taken in a plane indicated by the line 5—5 in FIG. 4.

Figures 1, 3:
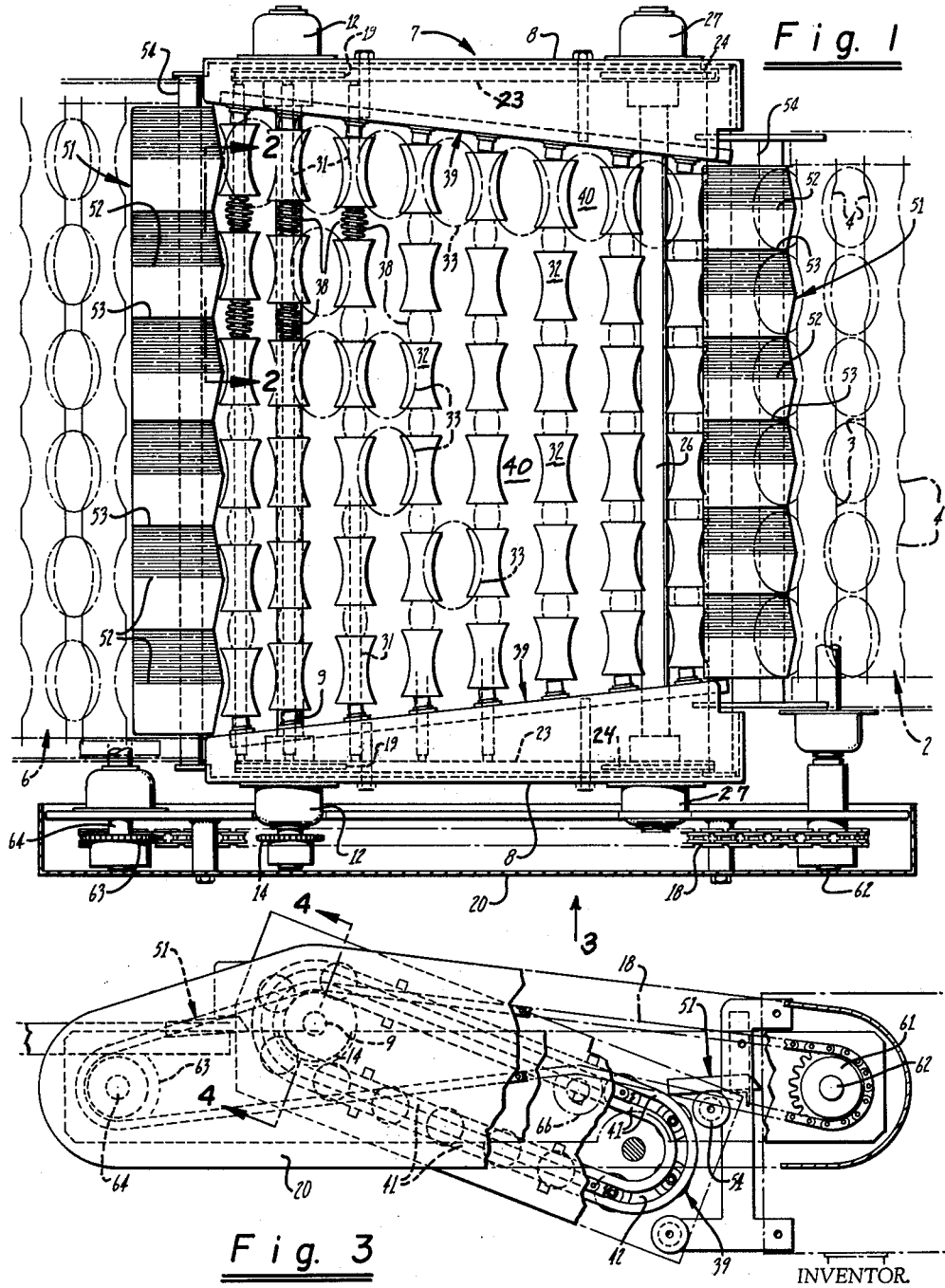
FIG. 1 is a plan view of the transfer mechanism hereof shown in position between two main conveyors; portions of the structure being broken away to illustrate the construction more clearly.
FIG. 3 is a side elevational view looking in the direction of arrow 3 in FIG. 1; portions of the structure being broken away to illustrate the construction more clearly.

Refering to FIG. 1, the right hand portion illustrates schematically the discharge end of a main conveyor 2, for example, in an egg washing machine of the type disclosed in assignee's copending application by applicant, Serial No. 65,396, filed October 27, 1960, now Patent No. 3,099,-848. In such type of conveyor rows of eggs are carried between resilient rotatable rollers 3 having a series of spaced circumferential concavities or depressions 4 which continuously convey side by side rows of eggs. The eggs are transferred from washer conveyor 2 to another main conveyor 6 which, for example, is an egg grader in which the rows of eggs are spaced more widely than they are on washer conveyor 2. The transfer conveyor hereof indicated generally by reference numeral 7 automatically repositions or rearranges the spacing between the rows of eggs so that they are fed properly onto the grader conveyor.

Transfer conveyor 7 is supported by spaced apart channel shaped frame members 8 which are fixedly supported on a suitable framework positioned between washer conveyor 2 and grader conveyor 6. Adjacent one end thereof, channels 8 carry a drive shaft 9 for conveyor 7, which is journalled for rotation adjacent each end in a bearing sleeve 11 mounted in a hub 12 fixedly secured to each channel 8; a support member 13 secured to each hub 12 providing firm support for bearing 11. In operation, shaft 9 is continuously rotated through a drive sprocket 14 fixed to shaft 9 by key 16 held in position by set screw 17. An endless drive chain 18 drives sprocket 14 from driving means taken off of conveyor 2 in a manner to be explained later. Such drive chain 18 and sprocket 14 are enclosed in channel shaped housing 20.

Spaced apart sprockets 19, one of which appears in FIG. 4, are each fixedly secured to shaft 9 adjacent an end thereof, by means of key 21 held by a set screw 22; and each of such sprockets 19 engages one turn of a transfer mechanism endless conveyor chain 23. The opposite turns of conveyor chains 23 engage spaced apart sprockets 24 fixedly secured to the respective end portions of a shaft 26 freely journalled in bearing structures mounted in hubs 27; such bearing structures being desirably of the same type previously described. From the preceding, it is seen that endless conveyor chains 23 are continuously driven when drive shaft 9 is continuously driven.

A plurality of parallel equally spaced apart shafts 31 are connected to conveyor chains 23, and are consequently moved in an endless closed path. Shafts 31 carry object supporting rollers 32 freely journalled for rotatable movement thereon and freely axially slidable therealong, for conveying the objects such as eggs 33 through the transfer conveyor. Referring to FIG. 4, each end of each shaft 31 is hollow and has an extension pin 34 inserted therein and connected to a conveyor chain 23; the pin carrying the usual sprocket teeth engaging roller 36.

Each of the egg supporting rollers 32 on the respective shafts 31 has a concave egg supporting surface and is made of soft resilient cushioning material, such as relatively soft rubber secured by vulcanization to a suitable metal bushing 37 which, as previously explained, is freely journalled on and axially slidable along the shaft. The adjacent rollers on the respective shafts are thrust apart by relatively light coil springs 38 surrounding the shafts, and all of like spring characteristics or in other words the same spring rating. Each spring 38 is interposed between the ends of the adjacent rollers with its ends bearing against the adjacent roller bushing 37 to minimize friction. The support members 32 can be merely keyed for free axial sliding movement along the shafts while still being thrust apart by springs 38 but such arrangement would not be advantageous because of increased friction, and the possibility of damage to the eggs.

Spaced apart annular confining guides 39 inclined with respect to each other with each guide adjacent the ends of the outermost rollers 32 on the shafts, form a tapered guideway 40 for automatically adjusting the spacing between rollers 32 as the shafts 31 are continuously moved. Such guides are desirably inclined at the same angle with reference to the direction of movement of the conveyor, and are fixedly secured to the respective transfer mechanism frame members 8; and each guide comprises a pair of spaced apart metal rings 41 (FIG. 4) forming a space 42 therebetween through which the ends of shafts 31 freely and loosely project; each space 42 being in line with an associated conveyor chain 23 which is at the outer side of the guide. Thus, as the conveyor chains 23 are continuously moved guide members 41 also form a guide trackway for shafts 31 without impeding their movement.

A floating washer 43 is positioned about each shaft 31 adjacent the inner face of each pair of guide members 41; and a friction reducing sleeve 44 is freely and loosely journalled about each end of each shaft 31, the sleeve being interposed between washer 43 and outermost roller 32. Desirably, washer 43 is of bronze to reduce friction to a minimum; and it will be noted that the outer end of each outermost roller bushing 37 bears against the inner end of a sleeve 44 to minimize friction.

It will be noted from FIG. 1 that a like number of rollers 32, desirably six, is carried on each shaft 31, and that the rollers are all of substantially the same axial length. Also, the combined axial length of each washer 43 and associated sleeve 44 is the same. Consequently, since all coil springs 38 are of substantially the same rating and also axial length, the spacing between the ends of rollers 32 will automatically vary gradiently as they are moved from main washer conveyor 2 to main grader conveyor 6 to adjust the spacing of the rows of eggs as they are conveyed and hence accommodate the difference in spacing between the rows of eggs on these main conveyors. In this connection, the strength of springs 38 is relatively immaterial as long as the outermost rollers 32 are always maintained in operative frictional engagement with an associated confining guide 39. However, it is desirable that the springs be relatively light to provide smooth action.

Means is provided to guide the transfer of eggs from washer conveyor 2 onto transfer conveyor 7, and from the transfer conveyor onto grader conveyor 6. Such means comprises at each end of transfer conveyor 7 a conventional directing chute 51 desirably of relatively soft resilient material, such as rubber, having alternate valleys 52, and peaks 53. At the washer conveyor end, the respective valleys 52 line up with rollers 32 as they pass the discharge end of washer conveyor 2; and a similar line-up with grader conveyor 6 obtains as the rollers pass the discharge end of transfer conveyor 7. Chutes 51 are, respectively, mounted on conventional rotatably adjustable shafts 54 so that their inclination can set at a desirable suitable angle.

Desirably, the drive of transfer conveyor 7 is taken off washer conveyor 2; and the drive of grader conveyor 6 is also taken off the washer conveyor. With reference to FIG. 3, such drive comprises a sprocket 61 fixedly secured to washer conveyor shaft 62 continuously driven in operation from a suitable prime mover (not shown). The aforementioned endless chain 18 is connected to sprocket 61 at one turn thereof, and engages the aforementioned sprocket 14 to provide the transfer conveyor drive which is imparted to shaft 9. At its opposite turn, chain 18 engages a sprocket 63 secured to a drive shaft 64 which provides the drive for grader conveyor 6; the under reach of chain 18 passing over an idler chain tensioning sprocket 66.

Although in the embodiment illustrated, the drive is taken off of the washer conveyor, it may be taken off the grader conveyor, or the transfer conveyor 7 may be independently driven in synchronism with the other conveyors. Also, as can be seen from FIG. 3, the transfer conveyor is inclined upwardly from washer conveyor 2 to grader conveyor 6. This is because in the embodiment illustrated, the washer conveyor is at a lower elevation. However, the transfer conveyor may be level or inclined in the opposite direction depending upon the respective heights of the main conveyors cooperating therewith.

Although the invention has been described for the transferring and repositioning of eggs, it is apparent that the principle thereof may be employed for the transfer of other types of objects such as fruits and vegetables, if so desired.

I claim:

1. Object conveying and positioning apparatus comprising a plurality of spaced apart substantially parallel shafts, means for supporting and moving said shafts about an endless closed path, object supporting members carried by the respective shafts for axially slidable movement therealong, resilient means between adjacent supporting members on the respective shafts, thrusting them apart, and spaced apart confining guides inclined relative to each other and cooperable with the outermost supporting members on the respective shafts for automatically adjusting the spacing between members as the shafts are moved.

2. Object conveying and positioning apparatus comprising a plurality of spaced apart substantially parallel shafts, means for supporting and moving said shafts about an endless closed path, object supporting rollers carried by the respective shafts for rotatable movement thereon and axially slidable movement therealong, spring means between the ends of all adjacent rollers on the respective shafts thrusting them apart, and spaced apart roller confining guides inclined relative to each other for forming a guideway through which the rollers are moved and for automatically adjusting the spacing between said rollers as they are thus moved.

3. Conveying and positioning apparatus for eggs or the like, comprising a plurality of spaced apart substantially parallel shafts, means for supporting and moving said shafts about an endless closed path, egg supporting rollers carried by the respective shafts for rotatable movement thereon and axially slidable movement therealong, each of said rollers having a concave supporting surface, a coil spring between the ends of all adjacent rollers on the respective shafts surrounding the shaft and thrusting such rollers apart, and spaced apart roller confining guides inclined relative to each other for forming a guideway through which the rollers are moved and for automatically adjusting the spacing between said rollers as they are thus moved.

4. The apparatus of claim 3 wherein each of said guides is inclined at substantially the same angle to the direction of movement of said shafts and all of said springs are of substantially the same rating.

5. The apparatus of claim 3 wherein the number of rollers on each shaft is the same and all of said rollers are of substantially the same length.

6. Object conveying and positioning apparatus comprising a plurality of spaced apart substantially parallel shafts, means for supporting and moving said shafts about an endless closed path, object supporting rollers carried by the respective shafts for rotatable movement thereon and axially slidable movement therealong, spring means between the ends of all adjacent rollers on the respective shafts thrusting them apart, spaced apart roller confining guides inclined relative to each other for forming a guideway through which the rollers are moved and for automatically adjusting the spacing between said rollers as they are thus moved, each guide comprising a pair of spaced apart annular guide members between which the shafts project, and said means for supporting and moving said shafts including a pair of endless sprocket chains at the outer sides of said guides.

7. The apparatus of claim 6 wherein a friction reducing sleeve about each shaft is interposed between the outer end of each of the outermost rollers and an associated guide.

References Cited in the file of this patent
UNITED STATES PATENTS
2,531,292   Page ------------------ Nov. 21, 1950